(12) United States Patent  
Shostak

(10) Patent No.: US 8,977,548 B2  
(45) Date of Patent: Mar. 10, 2015

(54) SPEECH RECOGNITION SYSTEM AND METHOD USING GROUP CALL STATISTICS

(71) Applicant: Vocera Communications, Inc., San Jose, CA (US)

(72) Inventor: Robert E. Shostak, Portola Valley, CA (US)

(73) Assignee: Vocera Communications, Inc., San Jose, CA (US)

( * ) Notice: Subject to any disclaimer, the term of this patent is extended or adjusted under 35 U.S.C. 154(b) by 0 days.

(21) Appl. No.: 13/948,120

(22) Filed: Jul. 22, 2013

(65) Prior Publication Data

US 2014/0039894 A1     Feb. 6, 2014

Related U.S. Application Data

(63) Continuation of application No. 13/029,954, filed on Feb. 17, 2011, now Pat. No. 8,498,865, which is a continuation-in-part of application No. 12/253,898, filed on Oct. 17, 2008, now Pat. No. 8,175,887, and a continuation-in-part of application No. 11/000,590, filed on Nov. 30, 2004, now Pat. No. 7,457,751.

(51) Int. Cl.
*G10L 15/04*     (2013.01)
*G10L 15/19*     (2013.01)
*G10L 15/22*     (2006.01)

(52) U.S. Cl.
CPC ............ *G10L 15/04* (2013.01); *G10L 15/19* (2013.01); *G10L 2015/228* (2013.01)
USPC ........................................................ 704/251

(58) Field of Classification Search
CPC ................................ G10L 15/04; G10L 15/19
USPC ............................................ 704/252, 276, 25
See application file for complete search history.

(56) References Cited

U.S. PATENT DOCUMENTS

| | | | |
|---|---|---|---|
| 5,067,149 A * | 11/1991 | Schneid et al. | 379/265.03 |
| 5,267,305 A * | 11/1993 | Prohs et al. | 379/233 |
| 5,515,426 A | 5/1996 | Yacenda et al. | |
| 5,596,634 A | 1/1997 | Fernandez et al. | |
| 5,691,973 A * | 11/1997 | Ramstrom et al. | 379/252 |
| 5,819,183 A | 10/1998 | Voroba | |
| 5,960,004 A * | 9/1999 | Ramstrom et al. | 370/469 |
| 5,960,366 A | 9/1999 | Duwaer | |
| 5,987,408 A | 11/1999 | Gupta | |
| 5,987,410 A | 11/1999 | Kellner et al. | |
| 6,381,341 B1 | 4/2002 | Rhoads | |

(Continued)

FOREIGN PATENT DOCUMENTS

| | | |
|---|---|---|
| EP | 1 085 499 A2 | 3/2001 |
| WO | WO 03/021990 | 3/2003 |

OTHER PUBLICATIONS

International Preliminary Report on Patentability dated Jul. 17, 2008 (12 pages).

(Continued)

*Primary Examiner* — Michael N Opsasnick
(74) *Attorney, Agent, or Firm* — DLA Piper LLP (US)

(57) ABSTRACT

An enhanced speech recognition system and method are provided that may be used with a voice recognition wireless communication system. The enhanced speech recognition system and method take advantage of group to group calling statistics to improve the recognition of names by the speech recognition system.

13 Claims, 11 Drawing Sheets

(56) References Cited

U.S. PATENT DOCUMENTS

| | | | |
|---|---|---|---|
| 6,480,597 B1 * | 11/2002 | Kult et al. | 379/242 |
| 6,565,000 B2 | 5/2003 | Sehr | |
| 6,761,637 B2 | 7/2004 | Weston et al. | |
| 7,039,589 B2 | 5/2006 | Whitham | |
| 7,172,113 B2 | 2/2007 | Olenick et al. | |
| 7,302,392 B1 * | 11/2007 | Thenthiruperai et al. | 704/251 |
| 7,487,095 B2 * | 2/2009 | Hill et al. | 704/275 |
| 7,606,714 B2 * | 10/2009 | Williams et al. | 704/275 |
| 2002/0087328 A1 | 7/2002 | Denenberg et al. | |
| 2002/0118811 A1 | 8/2002 | Davis et al. | |
| 2004/0157648 A1 | 8/2004 | Lightman | |
| 2005/0089150 A1 * | 4/2005 | Birkhead et al. | 379/88.14 |
| 2006/0049936 A1 | 3/2006 | Collins et al. | |
| 2006/0116885 A1 | 6/2006 | Shostak | |

OTHER PUBLICATIONS

Office Action in Corresponding Canadian Patent Application No. 2,588,604 dated Dec. 3, 2010 (10 pages).

* cited by examiner

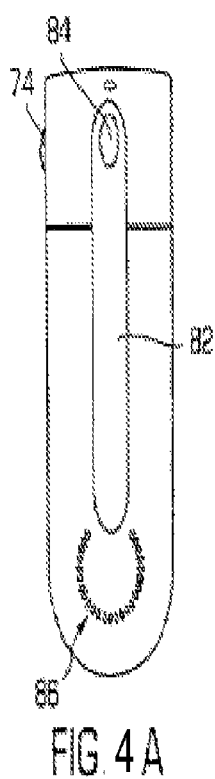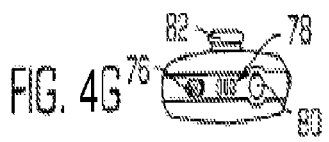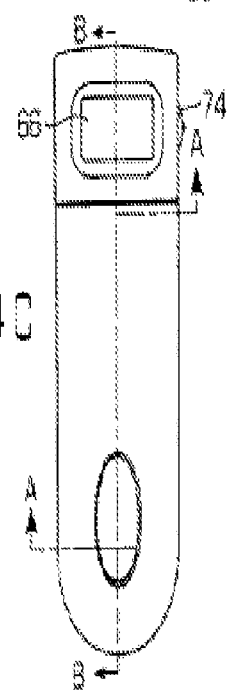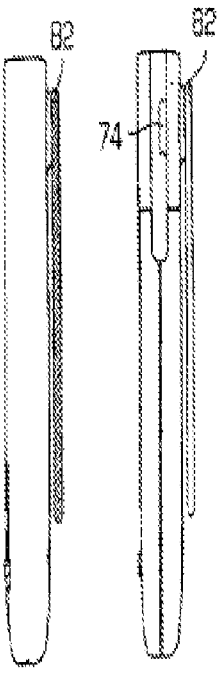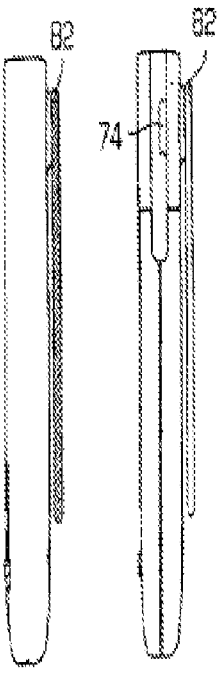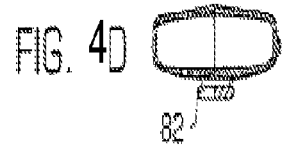

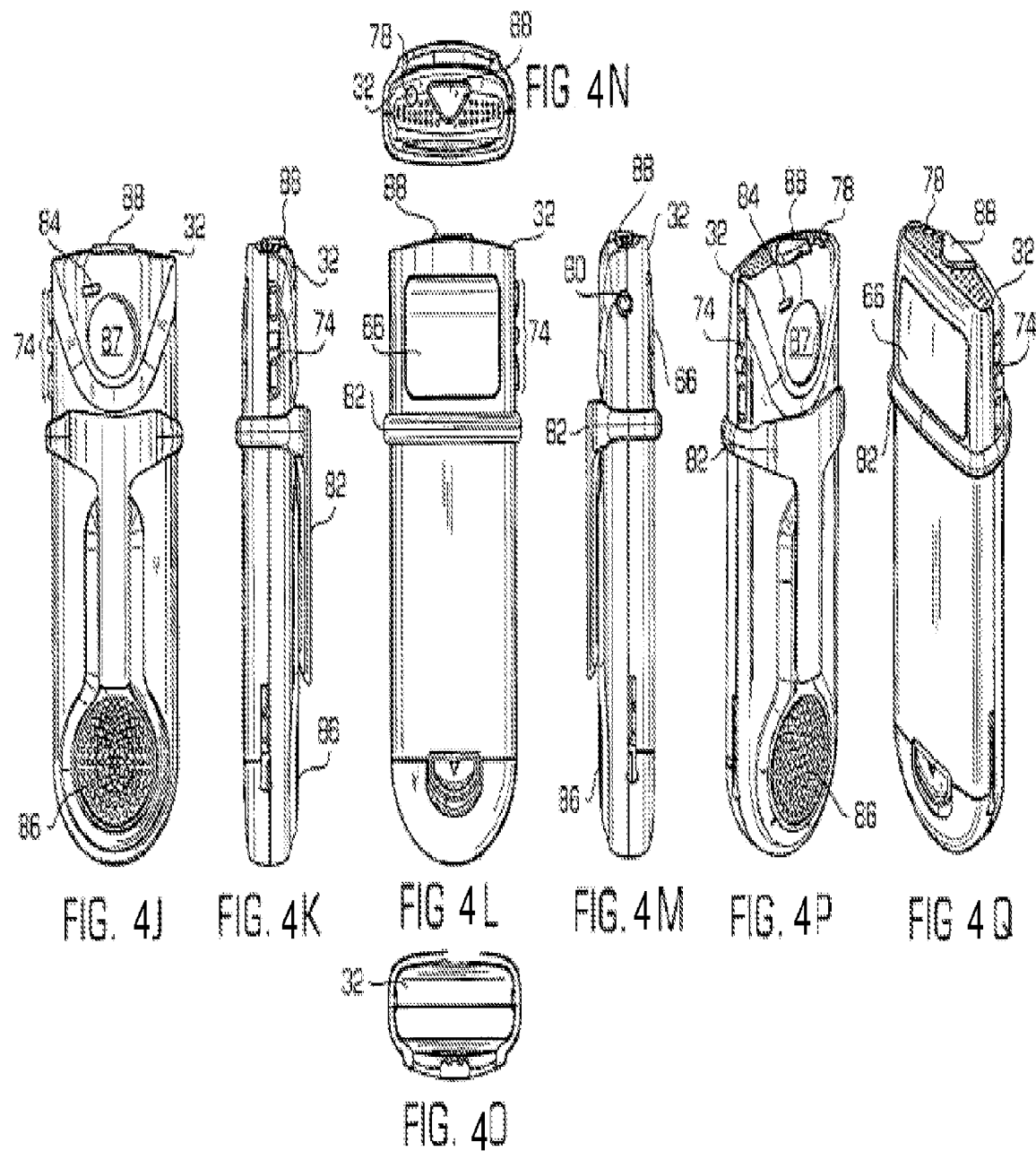

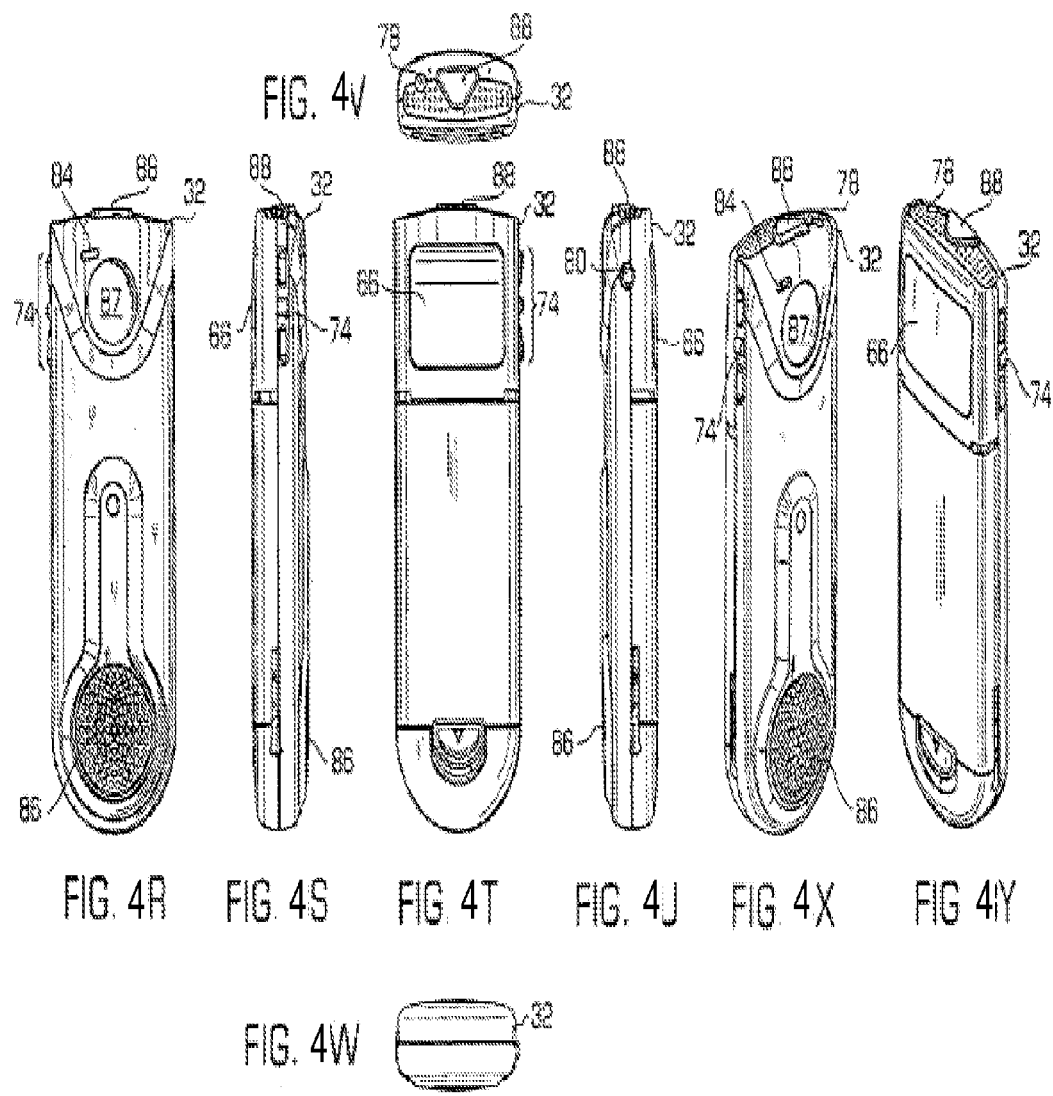

Statistics for Callls from Oncology Department

| Called Dept. | Total Calls | Calls % |
|---|---|---|
| Cancer Center | 1307 | 53% |
| Nursing Admin | 977 | 40% |
| PICU | 52 | 2% |
| 2100 | 37 | 2% |
| Administration | 10 | 0% |
| 5300 | 9 | 0% |
| NICU | 7 | 0% |
| Pharmacy | 5 | 0% |
| L and D | 5 | 0% |

```
ADD/EDIT GROUP -- WEBPAGE DIALOG                              ☒
HTTP://192.168.0.2:8080/CONSOLE/USER/GROUPDIALOGFRAME.JSP    ⌄
```

EDIT GROUP ( INFO )( DEPT )( MEMBER )( FORWARD )( PERMISSIONS )( CONFERENCE )  ⓘ

DEPARTMENT

USE A GROUP AS A DEPARTMENT TO ASSIST SPEECH RECOGNITION OR TO SPECIFY AUTHORIZATION CODES FOR LONG DISTANCE CALLS.

☐ USE THIS GROUP AS A DEPARTMENT

PIN FOR LONG DISTANCE CALLS
[                    ]

COST CENTER
[                    ]

( SAVE )  ( CANCEL )

SPEECH RECOGNITION SYSTEM AND METHOD USING GROUP CALL STATISTICS

PRIORITY CLAIMS/RELATED PATENT APPLICATIONS

This application claims priority under 35 USC 120 to and is a continuation of U.S. patent application Ser. No. 13/029,954 filed on Feb. 17, 2011 and entitled "Speed Recognition System and Method Using Group Call Statistics" (to be issued as U.S. Pat. No. 8,498,865 on Jul. 30, 2013) which in turn claims priority under 35 USC 120 and is a continuation in part of U.S. patent application Ser. No. 12/253,898, filed on Oct. 17, 2008 and entitled "System and Method for Improving Recognition Accuracy in Speech Recognition Applications" (issued as U.S. Pat. No. 8,175,887 on May 8, 2012) and U.S. patent application Ser. No. 11/000,590 filed on Nov. 30, 2004 and entitled "System and Method for Improving Recognition Accuracy in Speech Recognition Applications" (now U.S. Pat. No. 7,457,751).

FIELD

The disclosure relates generally to a system and method for correctly distinguishing among multiple possible interpretations of utterances in speech recognition applications. In particular, this disclosure relates to a system and method for distinguishing among multiple possible interpretations of utterances by the speech recognition unit of a communications system.

BACKGROUND

Speech recognition systems are well known technologies today. A speech recognition system is used, for example, in telephone automated response systems, communication system and other systems in which it is desirable to be able to have a computer system recognize speech and commands from a human being and then act on those commands. An example of a commercially sold speech recognition system is sold by Nuance Communications, Inc.

One problem that exists in speech recognition systems is scalability. In particular, when a speech recognition system is scaled in size, the number of user names in the speech recognition database becomes very large. As a result, it becomes more difficult for the speech recognition system to correctly recognize a user name. As a result, the user experience with the speech recognition system can be frustrating or the speech recognition system can fail to corrected identify a user based on a voice command.

In some applications of speech recognition that require calling, the frequency of calls made by a given person to other persons is non-uniform; i.e., some users are called by a given user with greater probability than others. In certain contexts, the patterns of calling may satisfy the following two properties.

The locality property of a speech recognition system, which means that a person in a particular group (or department) tends to call people in a limited set of other groups (or departments).

The substitutability property of a speech recognition system, which means that a person in a particular group tends to call the same other groups as other people who are in the same particular group.

These properties can be harnessed to overcome the scalability problem with speech recognition system and it is desirable to provide a speech recognition system and method that harnesses these properties and it is to this end that the disclosure is directed.

BRIEF DESCRIPTION OF THE DRAWINGS

FIGS. 4A-4H and 4J-4Y illustrates different embodiments of a badge device that can be used with the voice-controlled wireless communications system;

FIG. 7 illustrates an example of calling statistics that may be used by the speech recognition method;

FIG. 9 illustrates a group/department selection user interface of the voice-controlled wireless communications system of FIG. 1.

DETAILED DESCRIPTION OF ONE OR MORE EMBODIMENTS

The disclosure is particularly applicable to a voice controlled wireless communication system that uses speech recognition as described below and it is in this context that the disclosure will be described. It will be appreciated, however, that the system and method for speech recognition using group call statistics has greater utility since the system and method disclosed below may be used with any system that incorporates a speech recognition system in which it is desirable to increase the speech recognition accuracy of the system. In addition, although the system below is described in a health care installation, the system and method for speech recognition using group call statistics also may be used in other industries in which group calling patterns exist and can be used to improve the speech recognition and is thus not limited to the exemplary health care industry.

Figure 1:
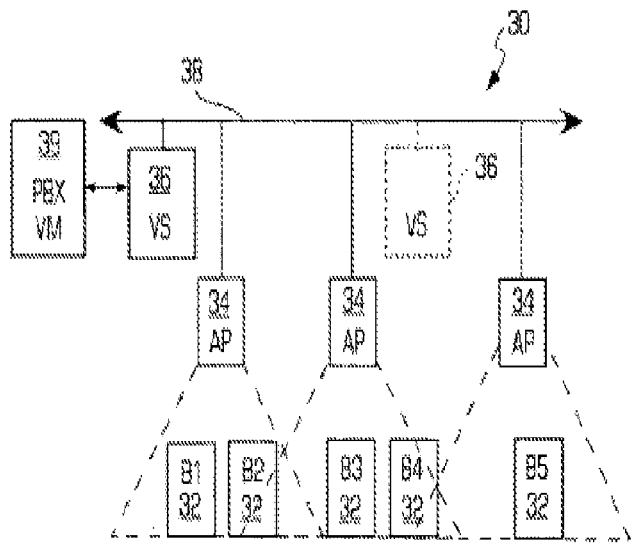
FIG. 1 depicts an example of a voice-controlled wireless communications system that may utilize a speech recognition system.

FIG. 1 depicts an example of a voice-controlled wireless communications system 30 that may utilize a speech recognition system. The system comprises a plurality of wireless communication devices or access devices referred to as Badges 32 below (marked B1-B5 in this example), one or more concentrators 34 (marked AP), such as wireless access points for example, and one or more central computers referred to as controlling computers 36 (marked VS), as shown. The concentrators 34 in FIG. 1 may be standard off-the-shelf wireless access points, such as a standard 802.11 access point in one embodiment, which collectively implement a wireless network allowing the Badges 32 to communicate with other components of the communications system 30. The concentrators 34 communicate with each other, and with the controlling computer 36, over a computer network 38 which may be a local area Ethernet network in one embodiment. Taken together, the concentrators 34 and the computer network 38 provide the network infrastructure for the wireless communications system 30. Any of the controlling computers 36 may also be interfaced to a telephone system such as a Private Branch Exchange (PBX) system 39, which allows the wireless communications system 30 to communicate with common telephone communication systems. Each Badge 32 is a wireless communications device that is capable of communicating with a concentrator 34, and therefore is also capable of communicating with the controlling computer 36 in order to implement the desired wireless communication functions. Each Badge 32 serves as one of the primary communications endpoints of the system.

Figure 2:
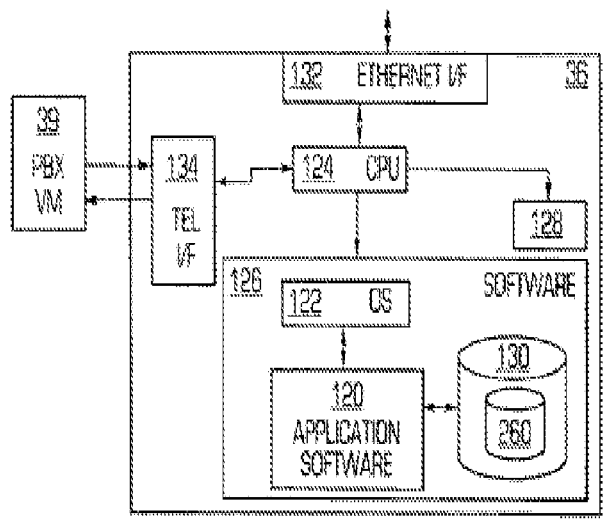
FIG. 2 is a block diagram of an exemplary controlling computer (VS) of the voice-controlled wireless communications system.

FIG. 2 is a block diagram of an exemplary controlling computer (VS) 36 of the voice-controlled wireless communications system. The controlling computer 36 is responsible for the overall control of the system. In one embodiment, the controlling computer 36 may be a typical off-the-shelf computer system, such as a typical server computer, the hardware details of which are well known. In more detail, the central computer 36 may include a central processing unit (CPU) 124 and a persistent storage device 128, such as a hard disk drive, an optical drive, a flash memory or the like. The controlling computer may also have telephony interface hardware 134 that permits the controlling computer to interface to a telephone and/or Public Branch Exchange (PBX) system 39, and a computer network interface 132, such as the Ethernet interface shown, that permits the controlling computer to connect to the computer network. In addition, the controlling computer 36 must have a memory 126 that stores software currently being executed by the CPU 124. This software includes at a minimum an operating system 122, application software 120 to implement the wireless communication functions of the wireless communications system, and a database 130 to store information associated with the wireless communications system. This database information includes but is not limited to a grammar database 260 that is part of the system into which name information, group calling statistics for different groups of users, probabilities that are determined for users of a particular group based on the group calling statistics for the particular group and the modified grammar as a result of the probabilities from the system and method that are stored as described below in more detail.

The database 130 stores user information, including the assignment of users to devices, speech files containing user name prompts and voice signatures, user preferences and so forth. It also keeps track of the whereabouts of users as they roam within the communications network. In large corporate installations, this component may interface to global employee databases maintained by the customer. Some information fields in database 130, for each user of the system, may include but are not limited to the following: user name, login name, password, alternative name/identifier, phone number and address, voicemail greeting message, ring tone, caller identifier status (on/off), buddy list, block list of calls to block, message forwarding service status (on/off and if on, to what number), distribution groups (e.g. "Memory Marketing Team"), saved messages, and device serial number.

Figure 3:
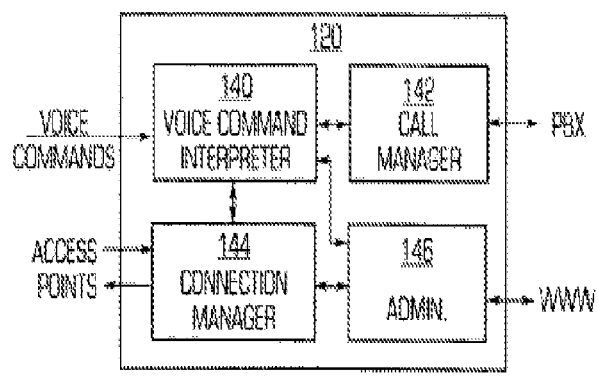
FIG. 3 is a block diagram of the application software component of the controlling computer shown in FIG. 2.
Figure 8:
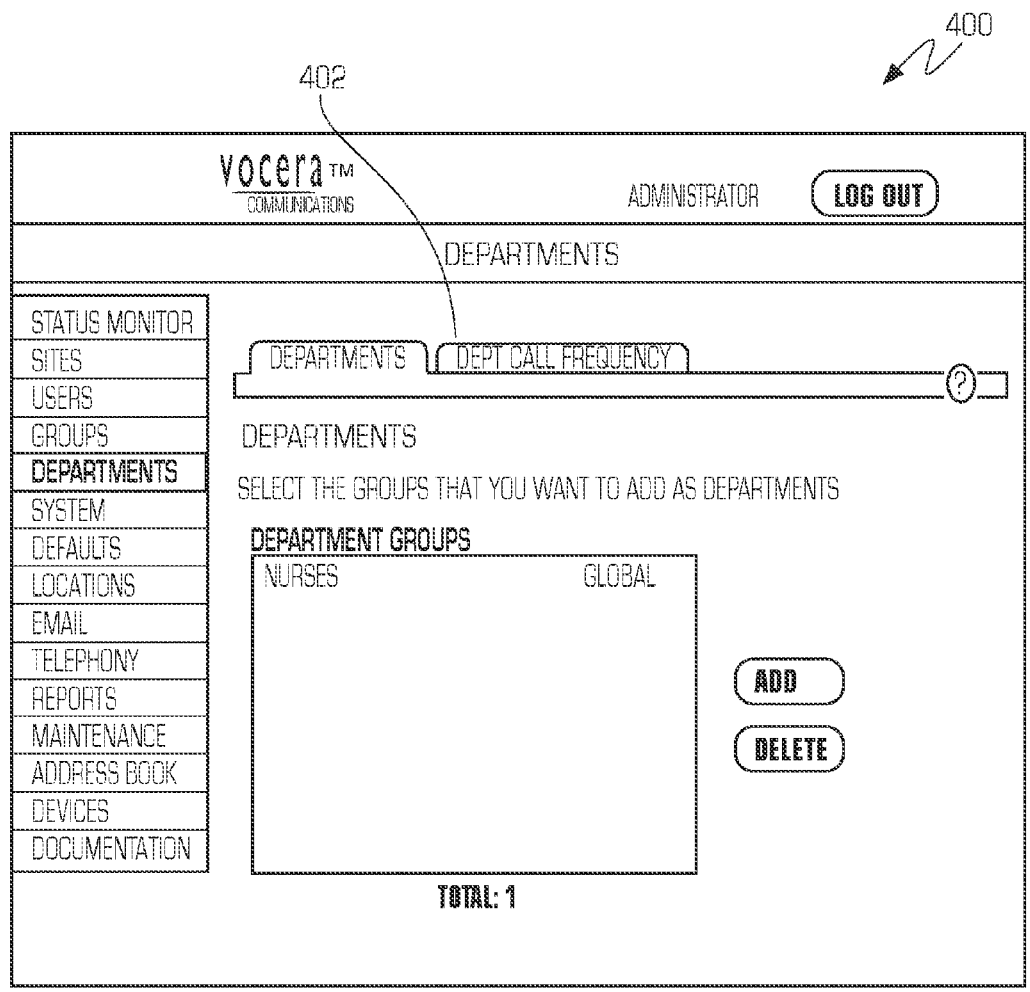
FIG. 8 illustrates a department assignment user interface of the voice-controlled wireless communications system of FIG. 1 when used in a health care industry.
Figure 10:
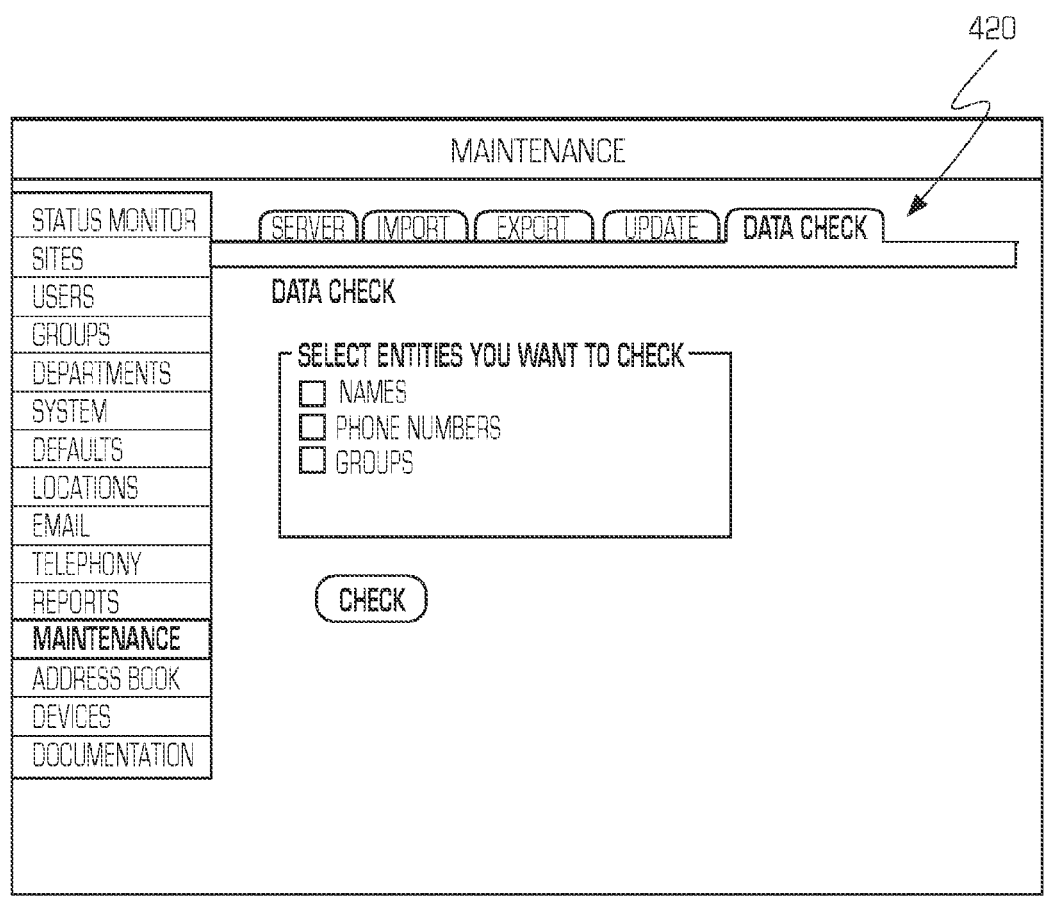
FIG. 10 illustrates a data check user interface of the voice-controlled wireless communications system of FIG. 1.

FIG. 3 is a block diagram of the application software component 120 of the controlling computer shown in FIG. 2. In one embodiment, the application software comprising one or more portions of code wherein each portion of the code has a plurality of lines of computer instructions that implement the operations and functions described below. The software may include a voice command interpreter 140, a call manager 142, a connection manager 144, and an administrator 146 that are interconnected together and exchange commands and data with each other as shown. The voice command interpreter 140 has responsibility for interpreting and executing voice-based commands received from the Badges. The call manager 142 has responsibility for the set-up and the breakdown of two-party and multi-party calls (including external calls) and maintaining status information associated with these calls. The connection manager 144 is the component that is responsible for managing access points and the connections among Badges and access points. It also supports a hand-off from one access point to another as a Badge roams about the network. The administrator module 146 supports administrator-level and user-level configuration and monitoring of the system through a web browser interface as shown. The administrator user interfaces for the group calling functionality is described below with reference to FIGS. 8-10.

As an example of the use of the system above, suppose a person wearing a Badge wants to speak to Maria Bettini, who is also wearing a Badge. The person initiating the communication presses a button on the Badge, receives an audible prompt, and then utters the command "Call Maria Bettini." The Badge digitizes this utterance and transmits it as data packets over the wireless network to the controlling computer. A speech recognition engine in the controlling computer (described in more detail with reference to FIG. 5) associates the argument in the command (Maria Bettini) with a user in the configuration database, and the controlling computer then establishes communication between the Badge of the person who initiated the call and Maria Bettini's Badge. After establishing the communication session, the controlling computer drops out of the process, the two Badges communicate directly with each other over the wireless net, and no additional speech recognition is performed.

In one embodiment, a person wearing the Badge can utter a command that comprises a verb and an argument. The verb specifies the action that the person initiating the communication wants to perform with the Badge. Examples of verbs include "Call," "Send a message to," and "Broadcast to." The system defines a static set of verbs; that is, the available verbs are the same at every customer installation. The argument specifies the name of a Badge user (such as "Maria Bettini"), a group of Badge users (such as "Fifth Floor Nurses"), or an address book entry (a person or place that does not have a Badge, but whose name and phone number are entered in the customer configuration database, such as "Poison Control"). The set of possible arguments is specified in the customer configuration database and is dynamic—that is, the database entries differ at every customer installation, and users at customer installations can add and remove database entries continually. Because the set of arguments contains not just Badge users but also groups of Badge users and outside entities, the number of possible arguments can be quite large. Together, the entire set of words and phrases the system can recognize—the set of verbs and arguments—composes the recognition space.

Figure 4Z:
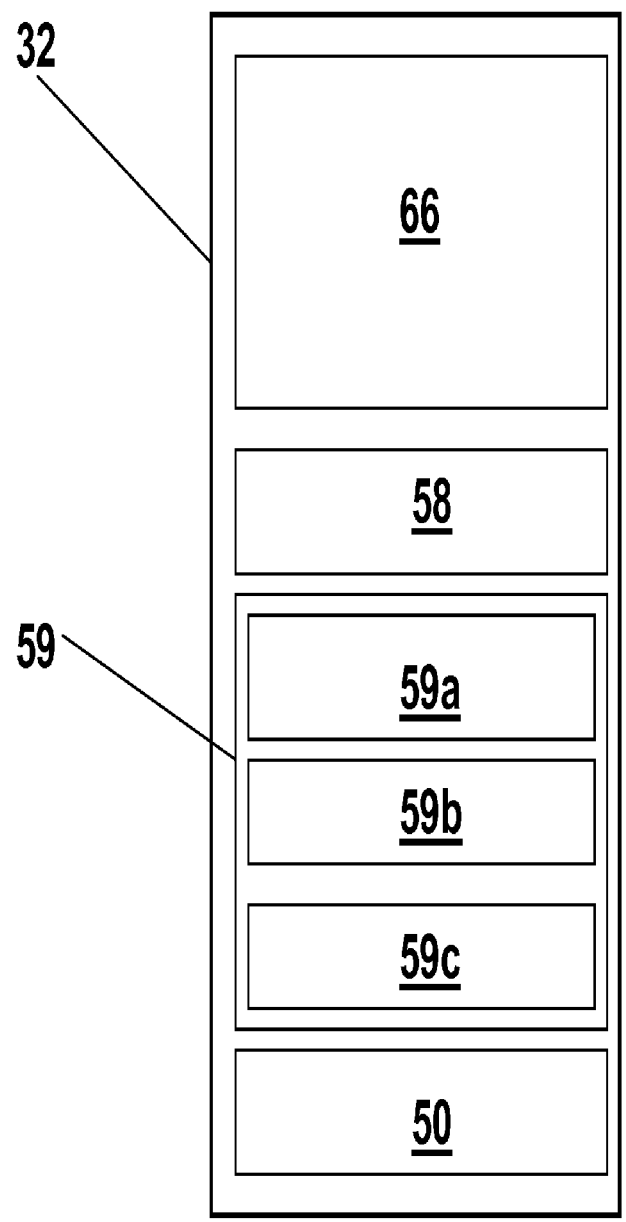
FIG. 4Z illustrates an access device having a badge application for use with the voice-controlled wireless communications system.

FIGS. 4A-4H and 4J-4Y illustrates different embodiments of a badge device 32 that can be used with the voice-controlled wireless communications system and FIG. 4Z is an access device having a badge application for use with the voice-controlled wireless communications system. Before describing the details of the different embodiments of the badge, a general overview of the badge and its operation will be provided. The badge of the first two embodiments (shown in FIGS. 4A-4H and 4J-4Y) is a portable, battery-powered, lightweight, wireless device that serves as the primary communications endpoints of the system. The badges support hands-free, near full duplex voice communications using a small microphone (situated near the top of the badge as described below) and a speaker (located near the bottom of the badge as described below) or the microphone and speaker of the access device. In addition to the wireless communications, each badge is preferably capable of receiving text pages or from an e-mail client in the server 36 or from a browser application hosted on the server 36 and may include a display unit (as described below) to, among other things, permit reading of the text pages.

Each badge is only capable of voice communications when it is within the network neighborhood of any concentrator. The typical range of a concentrator is approximately 35 meters for an indoor concentrator and approximately 100 meters for an outdoor concentrator. Thus, when the badge is not within the range of any concentrator, voice commands do not work. When the badge is an access device with the badge application, the coverage may be by a plurality of cellular base stations with a cell coverage area of about 5 miles. When the access device are wired phones with network switch concentrators, each network switch has a connectivity area which is the area over which wired phones are connected to a particular network switch.

The badges of the first two embodiments are sufficiently small and lightweight enough so that the badge may be clipped onto a shirt pocket of the user, may be worn on a lanyard around the neck of a user or carried is a holster similar to cellular phone. In a typical environment with typical noise levels, hands-free operation using voice commands requires the badge to be situated approximately 0.5 meters from the mouth of the user so that the voice commands may be understood by the central computer. Thus, if the badge is carried in a holster, it may need to be removed from the holster and brought closer to the user's mouth for voice command, hands-free operation. For a semi-private conversation or operation in a loud environment with high noise levels, the badge may be inverted (so that the speaker is near the user's ear and the microphone is near the user's mouth) similar to a typical telephone. Optionally, a headphone jack may be provided on the badge. The badge may also include a clip (as described below) that may be used to clip the badge onto a shirt or shirt pocket or may be used to hold a corporate security badge.

The badges may be powered by a renewable energy source, such as a replaceable, rechargeable lithium polymer or lithium ion battery, that attaches to the back of the badge. The battery may be needed to be recharged each day for voice operation, but it may last longer if the badge is used for only text functions. The invention, however, is not limited to any particular energy source and any renewable or non-renewable energy source may be used. The badge may include a charging adapter as an accessory for recharging the renewable energy source and the charging adapter may be a docking station or simply a wall transformer.

The two embodiments of the badge shown in FIGS. 4A-4H and 4J-4Y may include a wireless transceiver and an antennae (that may be a 100 mw Bluetooth radio transceiver, an appropriate strength IEEE 802.11 (b) or (g) transceiver or any other wireless transceiver) that is used for wireless communications with the concentrators or with other badges as described below. In one embodiment, each badge contains an 802.11 (b) or (g) transceiver capable of transmitting at approximately 20 dBm (100 mW), and receiving with a sensitivity of approximately −85 dBm. The badges also contain a DSP engine and voice codec for speech processing and control, a display control processor and LCD display, a lithium battery with protection circuitry, an audio amplifier, microphone, and speaker. Each badge is factory-assigned a unique physical (MAC) address. The antennae for the wireless transceiver, in one embodiment, may be built into the clip of the badge or may reside completely within the badge. Each badge is assigned a unique wireless device address (so that it can be identified by each concentrator and the central computer.)

Each badge may further include a central processing unit (CPU) that controls the operation of the badge and each of its components including the wireless transceiver. For example, the CPU may also control a microphone and a speaker that are components of the badge and permit the user of the badge to communicate with the central computer using voice commands and receive voice responses from the central computer. The badge may further include a well known non-volatile memory chip (not shown) so that data stored in the badge (such as settings and messages) are not lost when the badge is powered down. For example, the non-volatile memory device may be a well known flash memory device. The microphone and speaker may also be used for voice communications with other badge users or third parties. The badge may further include an amplifier 64 that amplifies the signals provided to/from the microphone and speaker.

The badge 32 may also include a display device 66, such as a liquid crystal display (LCD), that may be used for various purposes, such as reviewing text messages and pages received by the pager receiver, to permit the user to control the operation of the badge and its configuration using a control menu or to announce the origin of an incoming call. In one embodiment, the display device 66 may be a monochrome dot-matrix display with approximately 32 rows and 60 columns. The display has sufficient resolution to permit four lines of approximately fourteen characters per line. In the preferred embodiment, the display device 66 may be situated on the back of the badge (as shown in FIG. 4C) to protect it from damage and so that it is not normally visible without flipping over the badge or removing it from its holster. As described above, the badge may include a renewable energy source, such as a removable, rechargeable batter as shown, that may include protection and charge management circuitry as is well known to prevent over-charging. The badge may further comprise a digital signal processor (DSP) and an audio codec for processing incoming speech from the microphone and for generating the voice signals generated by the speaker. For example, the DSP and audio codec are capable of compressing the digital voice data to reduce the amount of digital data used to communicate the voice commands to the server. The compression is performed by a commercially available compression software sold by VoiceAge. The badge 32 may further include an input device 74 that permits the user to control the operation of the badge and its configuration. In one embodiment, the input device may be a jog switch which is a spring-loaded compound-action switch that supports three momentary actions. In particular, the switch may be pressed inwards as an ordinary push button. The switch may also be rotated in either direction. The function of these actions depends on the context. For example, if a call is in progress, the up and down movements may control volume. When a call is not in progress, these movements may control menu and message scrolling in the display. Certain input operations may require that the switch is pushed in for more than some predetermined amount of time. In the following descriptions, it will be convenient to speak of the jog control as if it were three separate buttons for clarity. Therefore, the inward push control will be called the activate button; the other two controls will be referred to as the scroll up and scroll down buttons. Many jog operations are carried out by pressing and releasing almost immediately; we will say "press the activate button", for example, to mean press and quickly release. A few operations require holding for some predetermined period of time, such as at least half a second, before releasing. We will say "press and hold" in this case. Thus, the user interacts with the system through a combination of the jog switch and voice controls. In one embodiment, the input device 74 may be a touch button located in particular location, such as on the front of the badge, that may be pushed or touched to activate the same functions and operations being activated by the jog switch.

The badge may also include an on/off switch 76 and a status indicator 78. In one embodiment, the status indicator may include an LED that is capable of displaying one or more different colors to signal the operational status of the badge. For example, a slowly blinking green light indicates that the badge is within the network neighborhood and is operational while a slowly blinking read light indicates that the badge is not within a network neighborhood. The badge may further optionally include a headset jack 80 that enables the user to plug in an external microphone/speaker headset, such as an ear bud. When the external headset is plugged into the jack 80, the operation of the internal microphone and speaker is inhibited.

The wireless system must know which badge each user is wearing so that calls to the user can be properly routed. Badge assignment is the process of associating a badge with a particular user. The assignment may occur when a badge is first activated. At that time, the system prompts the user to identify himself verbally. Depending on the installation, it may also be necessary for the user to say a password provided to him by the administrator, or a voice signature that is matched against a pre-recorded entry in the database of the server 36. Assuming the user is known to the system, the system will recognize the name, and will then (after a confirmation) assign the badge to the user. When the badge has been dynamically assigned to the user, the user's profile stored on the server 36 will be associated with the particular badge so that, for example, the user's preferences are active or the alternate names of the user are known. Once assigned, the serial number of the badge will show up on the user's console (as described in more detail below), and the badge can display a welcome greeting, when turned on, that is personalized to the user (e.g., "Hello, John"). The server 36 may also store text messages that may be downloaded to the badge at this time. A given badge can be assigned to at most one user at a time, and each user can be assigned only one badge at a time. A badge can later be reassigned to another user, if desired, via a voice command. Alternatively, the system administrator can explicitly set the serial number of the badge to be assigned to a user through the user console. A badge is not tightly bound to a single user as would be the case with a typical cellular phone, wireless e-mail device or other devices since the badge is dynamically bound to the user when the user uses the badge. As an example, when a badge is not being used by any particular user, it is not assigned to any user and is available for use by any user. When the user is assigned to a badge, the user profile on the server is associated with the badge. However, the user profile is not stored on the badge since the badge is merely a device used to access the system. As an example, a company may have 50 badges which are available for use. In accordance with the invention, when a user needs a badge, such as at the start of a workday, the user is assigned a badge (as described below) and uses the badge. At the end of the day, the user returns the badge to the charger station and the badge returns to an unassigned state in which any user may pick up and be assigned to the badge.

The bearer of the badge must typically first be registered with the system (or be registered by the administrator) before the badge can be assigned to him. In cases where visitors may be provided with a badge to be used temporarily, it may be useful for the administrator to register a few "Guest" users (the registration process only takes a moment) and assign guest badges to them. If desired, the spoken name of the guest can be entered through the user console, so that other users can hail him by name as opposed to, say, "Guest Three". As noted above, the assignment process entails that the user speak his own name so that he may be recognized by the system. The name will be recorded by the system and used for constructing a confirmation prompt when other parties call ("Finding . . . John Smith"). If the spoken name of the user is later changed in the User Console, the user will be prompted to re-speak the name the next time his badge is successfully activated. The user is similarly prompted to speak the identifying phrase ("John Smith in Sales") if one is provided. As shown in these two embodiments, the exact location of the various components on the badge may be varied without departing from the scope of the invention.

FIGS. 4J-4Y illustrate two other embodiments of the communications badge 32. These embodiments of the badge have the same elements as the prior embodiments so those elements will not be described. The embodiment shown in FIGS. 4J-4Q has the clip 82 as shown while the embodiment shown in FIGS. 4R-4Y do not have the clip. Both of these embodiments do not include the jog switch, but have a different device. In the embodiments shown, the display 66 may be a monochrome dot matrix with a grid size of 32 rows by 60 columns. The grid is sufficient to display up to four lines of approximately 14 text characters per line in a 5-point font. The display is situated at the back of the badge, and so is normally not viewable without some manipulation from its normal position. The display is used to indicate badge status (such as battery charge, on-off network status, and signal strength), to peruse text messages, to announce the origin of incoming calls, and for various control menu functions. In addition to the elements of the other badges, these badges include a activate button 87 and a do not disturb/hold button 88.

The activate button 87 is the primary control with which the user interacts with the badge and is a momentary push button on the front of the badge as shown. This button is used to initiate a dialog with the system agent (the "Genie"), as well as for various call control functions. The activate button supports two momentary actions; it may either be pressed and immediately released (a press), or pressed and held down (a press-and-hold) for longer than a brief moment. The length of a "brief moment" will need to be determined through experiment, but is likely to be approximately 600 milliseconds. While the functions of press and press-and-hold depend on the context, the general rule is that a press is used for an affirmative action (such as initiating or accepting a call). The press-and-hold is used to power down the badge.

The do not disturb/hold button 88 is a second momentary push button that is provided at the top of the unit as shown to allow the user to place the badge in a do-not-disturb (DND) mode (if no call is currently in progress), or to put a call on hold (if one is in progress). The button acts as a simple toggle. This button is backlighted by a single-color LED that is normally inactive, but turns on when in DND or Hold mode. It may be useful to distinguish between the two modes by having the LED blink while in DND mode, and continuously illuminated while a call is on hold, for example.

The input device 74 in these embodiments is a group of three small momentary push buttons is situated along one edge of the badge to facilitate volume adjustment during calls, and manipulation of the display menus when no call is in progress. The top and bottom buttons of the group increase and decrease call loudness, respectively, when a call is in progress. When the badge is inactive, they act as scroll controls for manipulating menus and text on the display. The middle button is used to make menu selections in this context.

The status indicator 78 in these embodiments is an LED display which is capable of displaying two colors is used to signal operational status. For example, a fast blinking green indicates that a message is waiting. Other blinking patterns (such as blinking red) may be used to indicate other conditions, such as hand-off in progress or low battery. The headset jack 80 is provided to enable one to plug in an external microphone/earphone combination. Use of the jack inhibits the operation of the built-in microphone and/or speaker.

FIG. 4Z is an access device having a badge application for use with the voice-controlled wireless communications system. The combination of the access device with the badge application operates as the badge 32 described above. The access device may be a processing unit based device having a microphone and speaker (not shown) that may be a phone, a cellular phone, a mobile phone, a Smart phone, a Blackberry-type device with a built-in communications capability, a Palm operating system based device with a communications capability, a Windows CE-based device with a communications capability or any other device that has a speaker, a microphone and sufficient processing power, memory and connectivity to execute the badge application. The access device may also have the display device 66 that may be used to display a series of user interface screens of the badge application along with the soft buttons of the badge application and the processing unit 58 that executes the badge application. The access device may also include the communications unit 50 described above and a memory 59, such as dynamic RAM, static RAM, flash memory, etc., that stores one or more pieces of software/modules executed by the processing unit. For example, when the badge application is being used to access the voice-controlled system, the memory may store an operating system 59a that controls the overall operation of the access device, a transmission application 59b to control the communications functions of the access device and a badge application 59c that implements the functions and operations of the badge device described above. The access device may also include a power source (not shown) and may include the other elements of the badge described above that are not shown or described herein.

Figure 5:
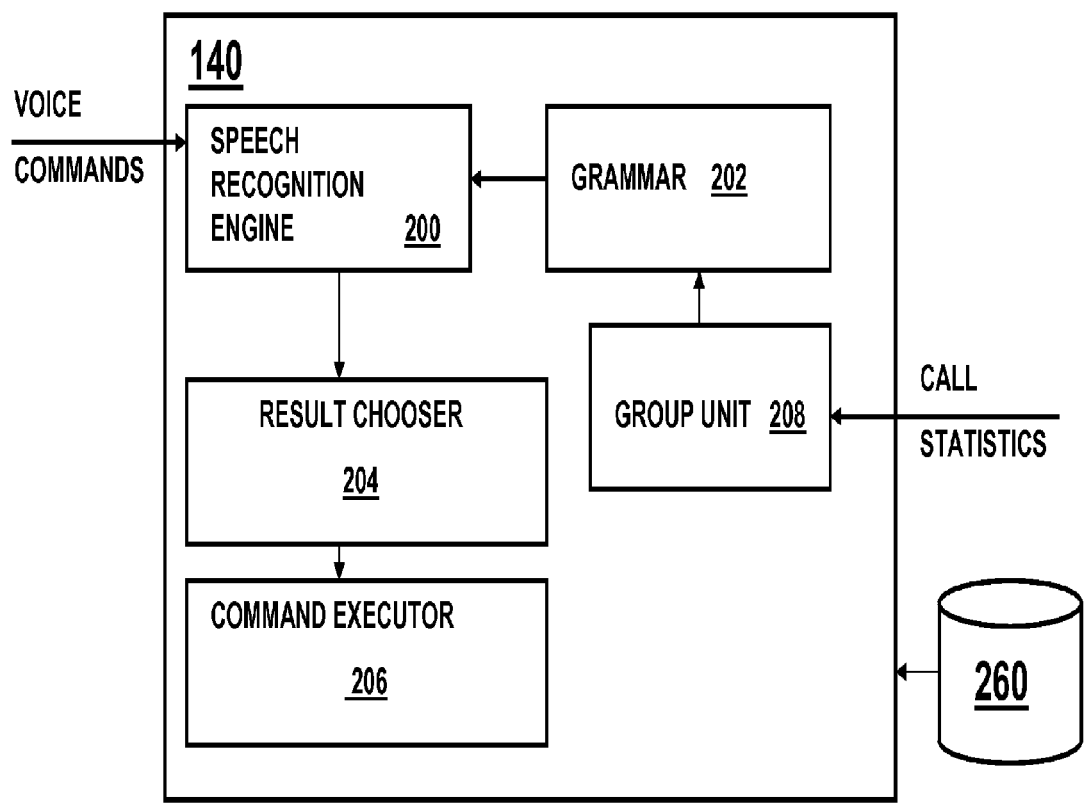
FIG. 5 illustrates more details of the voice command interpreter that may include a group unit.

FIG. 5 illustrates more details of the voice command interpreter 140 that may include a group unit. In a preferred embodiment, the voice command interpreter (and each of the elements set forth below) is implemented in software that has one or more portions of code with each portion of code having a plurality of lines of computer instructions, although the voice command interpreter may also be implemented in hardware or a combination of hardware and software. The voice command interpreter 140 may receive voice commands from a user that are fed into a speech recognition engine 200 (such as the commercially available Nuance speech recognition engine) and a grammar store 202 that is used by the speech recognition engine 200 to recognize commands and user words as is known. The voice command interpreter 140 may also include a result chooser 204 and a command executor 206 wherein the speech recognition engine 200 identifies one or more possible words for a voice command, the result chooser 204 selects the "best" words that correspond to one or more words of the voice command and the command executor 206 executes the command that was chosen by the result chooser 204. The voice command interpreter 140 may also include a group unit 208 that receives call statistics (as described below), generates group call statistics and probabilities, generates modified grammar based on the probabilities and then store modified grammar into the grammar store/database 202 (as described below) that enables the speech recognition to better recognize the voice commands (and in particular user names) by taking advantage of group calling statistics. In one implementation, then grammar store/database 202 may be stored in the grammar database 260 that is part of the system database 130. Now, the method implemented by the group unit is described in more detail although it should be understood that the method shown in FIG. 6 can be implemented on any system that utilizes a speech recognition system.

Figure 6:
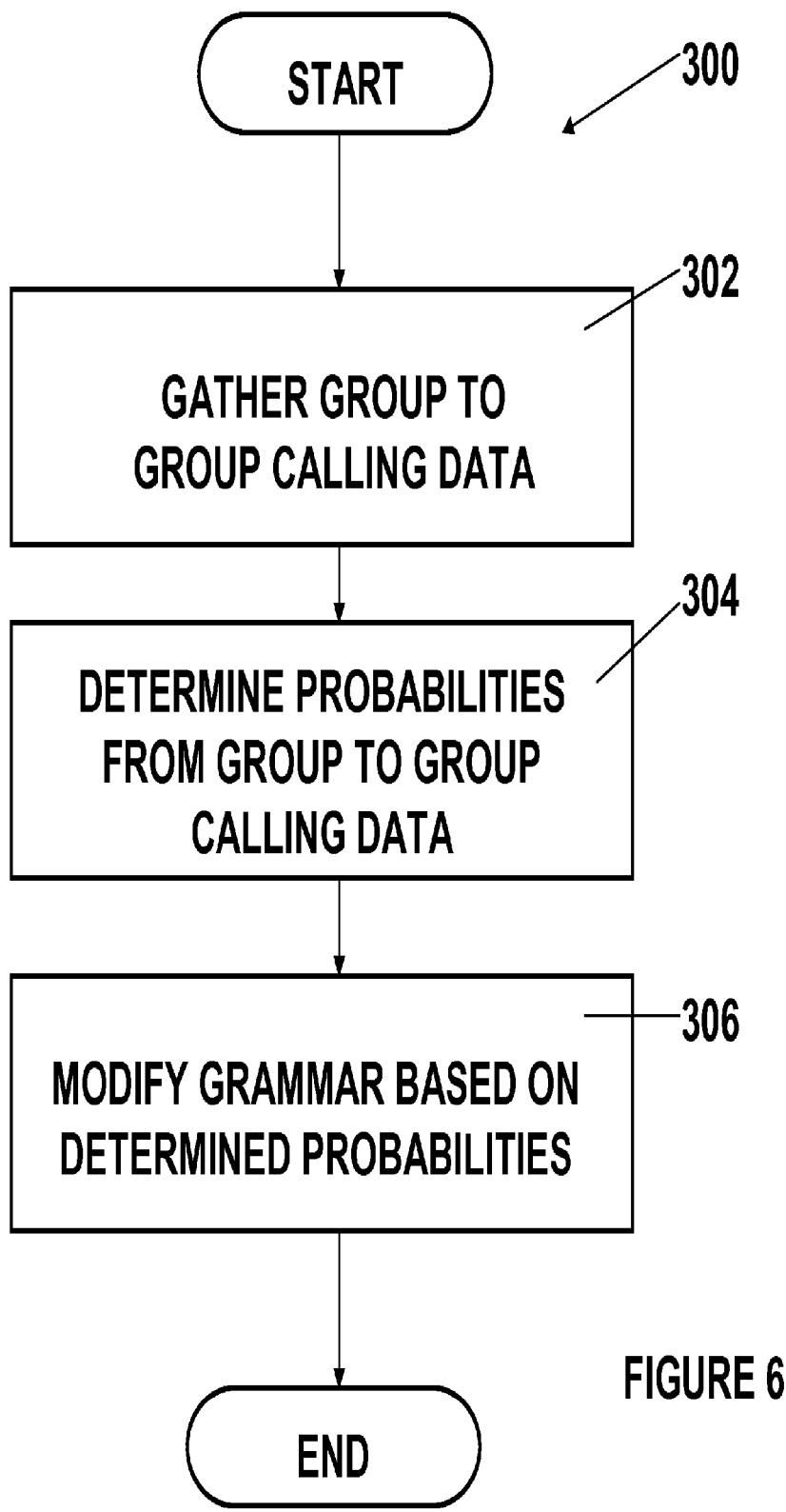
FIG. 6 illustrates a method for speech recognition using group calling.

FIG. 6 illustrates a method 300 for speech recognition using group calling and FIG. 7 illustrates an example of calling statistics 310 that may be used by the speech recognition method. In one implementation, the method process described below may be implemented in software that has one or more portions of code with each portion of code having a plurality of lines of computer instructions, although the method may also be implemented in hardware or a combination of hardware and software. The method may be implemented on a communication system (such as the speech recognition communication system described above) in which the system has one or more groups of user as described below. In the method, the group unit of the voice command interpreter may receive group to group calling data (302) from the speech recognition communication system. The group to group calling data may be gathered by a calling data gathering unit of the group unit and may be implemented in software in one example. In particular, for each call, the groups of the calling and called parties are determined and stored and then used to generate group to group calling statistics.

It has been discovered empirically that hospital calling patterns exhibit the two properties discussed above, locality and substitutability. An example of the group to group calling statistics for a hospital implementation of the speech recognition communication system is shown in FIG. 7. In the method, a group is one or more users of the speech recognition communication system who have been grouped together due to job functions, geographic location and the like. In a hospital implementation, each group may be a department of the hospital (such as a cancer center, nursing admin., PICU, etc. as shown in FIG. 7.) The group to group calling data may be data showing the calls made from a first group to other groups in an organization that is using the speech recognition communication system which results in probabilities that particular groups are called by other groups. For example, in FIG. 7, the statistics show calls from an oncologist group (a group of professionals that include the oncology specialists at the hospital) to the other groups within the hospital. In the method, a call data gathering module of the speech recognition communication system (not shown) may continuously gather the group to group call statistics as calls are placed.

Group-to-group calling statistics stabilize over a limited period of time which may be adjusted experimentally, and the system needs to reach a steady state before using the group calling statistics. For example, one may find experimentally that a system reaches a steady state over five weeks. In this example, the system would accumulate data for five weeks before taking advantage of the group calling statistics. To ensure that the group to group call statistics accurately reflect the current operating state of the speech recognition communication system (such as changes in the groups, changes in the memberships of the groups or changes in current calling patterns), the earlier group to group call statistics may be deleted after a predetermined period of time. Furthermore, the group call statistics that are used to calculate the probabilities are continuously updated (with older call data being discarded and newer call data being used). For example, if one were to find that the system required five weeks worth of data to reach a steady state, the oldest data would be aged out and deleted as new data was added, thus always maintaining a rolling five week collection. Similarly, older data could be deweighted instead of deleted, to ensure that current calling patterns were reflected. In the system, a set of call statistics for each group to all other groups in the speech recognition communication system may be gathered (which may be known as a particular group's group to group call statistics) and stored.

The group unit may, based on the group to group call statistics, determine a probability that a user assigned to a particular group will call a different group (304). A group probability unit of the group unit may perform this process and the group probability unit may be implemented in software in one example. Thus, the probabilities that each user of the particular group will call other groups is determined. A grammar expression based upon these probabilities may then be formulated as follows:

$$G = \bigcup_i (G_{dept_i} \sim P_i)$$

where $$\bigcup_i$$

is the union over each department $dept_i$, $dept_i$ represents the ith department, $G_{dept_i}$ is a grammar of terms that lists names in $dept_i$;

$P_i$ is the probability that a called user is a member of $dept_i$;

And $G_{dept_i} \sim P_i$ gives the grammar expression in which $G_{dept_i}$ is weighted by probability $P_i$.

For example, where there are four possible called departments, i=4 and the final grammar is the union of four department grammars, each weighted by its relative probability as follows:

$$G = (G_{dept_1} \sim P_1) \cup (G_{dept_2} \sim P_2) \cup (G_{dept_3} \sim P_3) \cup (G_{dept_4} \sim P_4)$$

The probabilities $P_i$ are computed from the stored statistics, modified as time goes on and calls continue to occur.

For users in the Oncology group shown in FIG. 7, the final grammar is the union of the Cancer Center, Nursing Admin, PICU, and 2100 grammars, each weighted with a probability based on its calling statistics as follows:

$$G = (G_{cancercenter} \sim 0.53) \cup (G_{NursingAdmin} \sim 0.40) \cup (G_{PICU} \sim 0.02) \cup (G_{2100} \sim 0.02)$$

As a result of the modified grammar described above, the speech recognition system is likely to be able to more accurately (and more quickly) recognize a spoken name by a user since the determined weightings allow the speech recognition to more accurately predict the user name. The improvement in speech recognition may show up as a reduction in error, an increase in the correct acceptance rates, or a combination of the two.

The system works best when all users are assigned to at least one department. To accommodate the possibility that this may not be the case, a "catch-all" grammar file is provided for each site, that lists unassigned users.

The above group calling statistics may be adjusted if the particular installation of the speech recognition system has a group with a very large number of users, but that group is not frequently called. The issue is that the large group that is not frequently called will result in users in that group being assigned low probabilities during the group to group call probabilities. To compensate for this situation, the probabilities of users in that group are adjusted upwards.

Similarly, if there exists insufficient calling statistics at any given time, the probabilities for some departments may be artificially low, and the speech recognition system may inappropriately eliminate names from consideration. To rectify this situation, each department must be given at least a minimum probability.

As an additional benefit, the above use of the group to group calling statistics to modify the grammar allows the system to have backoff dialogs to help recover from user error. For example, the following backoff dialog allows the system to recover from user who misremembers the last name of the calling party:

Backoff Dialog
User: Call Jerry Storm
Genie: Sorry, I didn't get that name. Please say the department
User: Hardware
Genie: OK, now say the first and last name—or just the first name if that's all you know
User: Jerry
Genie: Finding Jerry Stark . . .
User: Oh, that's his name—couldn't remember it While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A computer implemented speech recognition system, comprising:
    a communication system having one or more groups of users, each group of user having a group to group calling statistic that is a measure of whether the user of each group calls users of other groups of the communication system;
    a speech recognition engine that is part of the communication system and generates a set of voice command interpretations based on a voice command of a user and a set of grammar, the voice command including a name of a person; and
    the speech recognition engine further comprises a group unit that adjusts the grammar used by the speech recognition engine based on group to group calling statistics that modify a weighting of the grammar to facilitate the recognition of a name of a person used in the voice command.

2. The system of claim 1, wherein the group unit further comprises a call data gathering unit that gathers, for each call, a group to which a calling party is assigned and a group to which a called party is assigned to generate the group to group calling statistics for a particular group.

3. The system of claim 2, wherein the group unit further comprises a group probability unit that calculates, for a particular group, a probability that each other group in the communication system is called by users of the particular group based on the group to group calling statistics.

4. The system of claim 3, wherein the group unit further comprises a grammar modifier unit that modifies the grammar expression submitted to the speech recognition engine based on the probability that each other group in the communication system is called by users of the particular group.

5. The system of claim 2, wherein the call data gathering unit continuously gathers, for each call, a group to which a calling party is assigned and a group to which a called party is assigned to generate the group to group calling statistics for a particular group.

6. The system of claim 1, wherein the communication system further comprises a controlling computer, one or more concentrators connected to the controlling computer by a network, a badge that communicates using a protocol with one of the concentrators and wherein the controlling computer uses the speech recognition engine to receive a voice command from a particular user through the badge and interpret the voice command of the user to generate a set of voice commands interpretations.

7. The system of claim 1, wherein the communication system further comprises a controlling computer, an access device with a badge application that communicates with the controlling computer wherein the controlling computer uses the speech recognition engine to receive a voice command from a particular user through the badge application and interpret the voice command of the user to generate a set of voice commands interpretations.

8. The system of claim 1, wherein the one or more groups of users further comprises one or more departments in a health care industry.

9. A computer implemented speech recognition method in a communication system having one or more groups of users, each group of user having a group to group calling statistic that is a measure of whether the user of each group calls users of other groups of the communication system and wherein the communication system has a speech recognition engine that generates a set of voice command interpretations based on a voice command of a user and grammar, the voice command including a name of a person, the method comprising:

adjusting, using a group unit of the speech recognition engine, the grammar used by the speech recognition engine based on group to group calling statistics; and modifying, using the group unit of the speech recognition engine, a weighting of the grammar to facilitate the recognition of a name of a person used in the voice command.

10. The method of claim 9, wherein adjusting the set of grammar further comprises gathering, using a call data gathering unit of the speech recognition engine, for each call, a group to which a calling party is assigned and a group to which a called party is assigned to generate the group to group calling statistics for a particular group.

11. The method of claim 10, wherein adjusting the set of grammar further comprises calculating, using a group probability unit of the speech recognition engine, for a particular group, a probability that each other group in the communication method is called by users of the particular group based on the group to group calling statistics.

12. The method of claim 10, wherein the gathering further comprises continuously gathering, for each call, a group to which a calling party is assigned and a group to which a called party is assigned to generate the group to group calling statistics for a particular group.

13. The method of claim 9, wherein the one or more groups of users further comprises one or more departments in a health care industry.

* * * * *